(12) United States Patent
Bekkevold et al.

(10) Patent No.: US 6,612,010 B2
(45) Date of Patent: Sep. 2, 2003

(54) METHOD AND DEVICE FOR CONNECTING END PORTIONS OF TWO PIPES

(75) Inventors: Knut Håvard Bekkevold, Hof (NO); Finn G. Haugen, Notadden (NO)

(73) Assignee: Kongsberg Offshore AS, Kongsberg (NO)

( * ) Notice: Subject to any disclaimer, the term of this patent is extended or adjusted under 35 U.S.C. 154(b) by 29 days.

(21) Appl. No.: 09/897,461

(22) Filed: Jul. 3, 2001

(65) Prior Publication Data
US 2002/0050047 A1 May 2, 2002

(30) Foreign Application Priority Data
Jul. 3, 2000 (NO) .......................................... 20003444

(51) Int. Cl.[7] .............................. B21D 39/03; B23P 19/04
(52) U.S. Cl. .............................. 29/429; 29/237; 29/453; 285/315
(58) Field of Search ........................ 29/429, 237, 282, 29/453, 525.01, 771; 285/313, 315

(56) References Cited

U.S. PATENT DOCUMENTS

| | | | | |
|---|---|---|---|---|
| 3,604,731 A | * | 9/1971 | Petersen .................... 166/347 |
| 3,628,812 A | * | 12/1971 | Larralde et al. ............... 285/24 |
| 3,717,920 A | * | 2/1973 | Oliver et al. .................. 285/24 |
| 3,997,197 A | * | 12/1976 | Marsh et al. ................ 285/261 |
| 4,326,328 A | * | 4/1982 | Watkins ....................... 137/798 |
| 4,632,432 A | * | 12/1986 | Reneau ........................ 285/24 |
| 4,730,853 A | * | 3/1988 | Gjessing ...................... 138/89 |
| 4,868,964 A | * | 9/1989 | Schmitz ....................... 29/237 |
| 5,282,655 A | * | 2/1994 | Marietta ..................... 285/315 |

FOREIGN PATENT DOCUMENTS

GB    2 343 493 A    5/2000

* cited by examiner

Primary Examiner—David P. Bryant
(74) Attorney, Agent, or Firm—Young & Thompson (57) ABSTRACT

A method and a device for interconnecting two mutually coaxial and axially movable pipes (2 and 22 respectively), where one pipe (2) has a locking portion (16), and the other pipe (22) has a control body (30) and a locking part (26), which upon axial movement of the control body (30) is arranged to be moved between a first position, wherein the locking part (26) is not engaged with the locking portion (16), and a second position, wherein the locking part (26) is engaged with the locking portion.

12 Claims, 6 Drawing Sheets

METHOD AND DEVICE FOR CONNECTING END PORTIONS OF TWO PIPES

FIELD OF THE INVENTION

The invention relates to a method and a device for connecting a first end portion of a first pipe and a second end portion of a second pipe, where the end portions comprise respective components of a locking finger type connector, the first end portion comprising a locking portion, and the second end portion comprising a control body and locking parts or fingers, which, upon movement of the control body via an influencing portion thereof, is arranged to be moved between a first position, wherein the locking parts are not engaged with the locking portion and the pipe portions are not interconnected, and a second position, wherein the locking parts are engaged with the locking portion and the pipe portions are interconnected.

The device can be employed for connecting pipes which are linked to respective installations located on a seabed.

BACKGROUND OF THE INVENTION

In Norwegian patent application no. 19940464 an end cap is disclosed with a tubular end portion which can be connected to an end portion of a first pipe. The pipe has a circumferential groove which defines a locking portion or collar and the end cap has a number of locking parts or fingers which are arranged to engage with the collar. The object has an axially movable control body whereby the fingers can be pushed radially inwards to engage with the collar. This end cap, however, is freely movable before being connected with the pipe, thus enabling it to be very easily brought into abutment against the pipe before the fingers are brought into engagement with the collar. The end cap is not designed to be repeatedly mounted on and dismantled from the pipe by means of remote operation.

In the same patent application a device is also disclosed for connecting two pipes located on a seabed. For this purpose a large, heavy device is employed for pulling the pipes together. The device is complicated and cumbersome as well as being time-consuming to use, thereby making the connecting operation expensive.

SUMMARY OF THE INVENTION

The object of the invention is to provide a new method for connecting two pipes and a device for implementing the method. The device comprises a relatively small, light tool and the method involves a minimum of operations for hoisting components between the connecting site at the seabed and, e.g. a platform or a vessel at the surface.

This object is achieved according to the invention with a method and a device with characteristic features as set forth in the claims.

The tool involved in the device can be very easily removed from the connected pipes for use elsewhere. If there is a need to release the connection, e.g. in order to replace a packing between the pipes, the tool can equally easily be remounted at the pipe connection for releasing the locking parts from the locking portion and possibly move the pipe ends apart with great force. Without releasing the tool from the pipes, a packing, e.g., which is mounted between the pipes, can then be replaced by another packing and the pipes reconnected. In addition, the device may comprise components which permit a tightness test of the packing to be carried out.

BRIEF DESCRIPTION OF THE DRAWING

The invention will now be described in greater detail with reference to the drawing which schematically illustrates an embodiment of a device according to the invention.

The terms "up" and "to the left" should be understood to refer to the direction towards the edge of the drawing page facing away from the reader and towards the left-hand edge of the page relative to the reader. Moreover, the term "axial" should be understood with reference to the pipes' longitudinal axes.

DETAILED DESCRIPTION OF THE INVENTION

Figure 1:
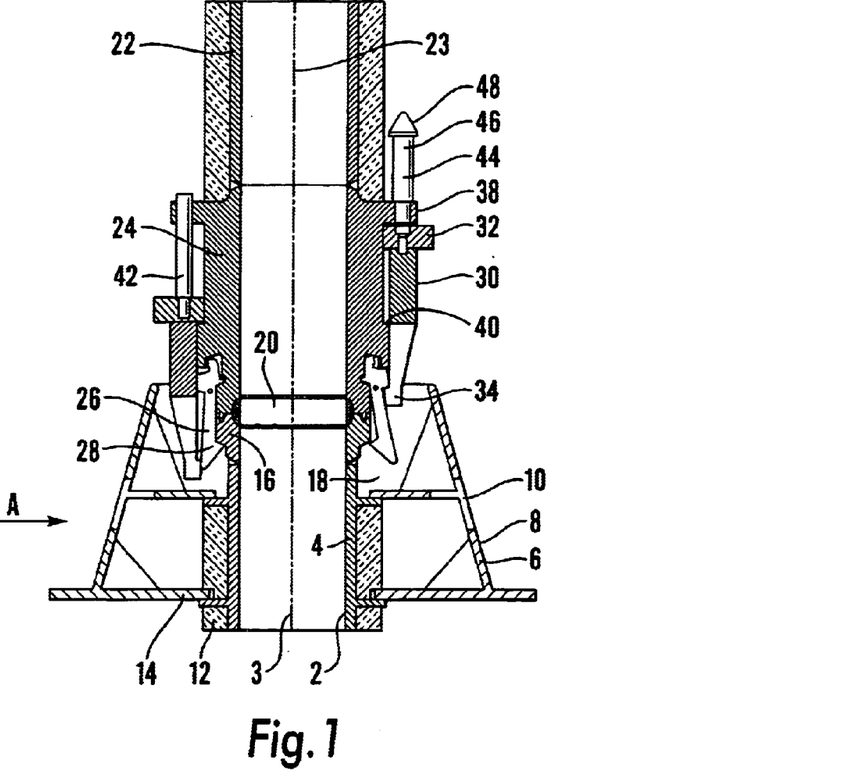
FIG. 1 illustrates a longitudinal section along line I—I in FIG. 5, without the tool illustrated in FIG. 2 and through end portions of a first, lower pipe and a second, upper pipe, where the right half of the figure shows a lower end portion of a locking part or finger of the upper pipe in a position, wherein the end portion has been moved radially outwards, with the result that it is not engaged with a collar or locking portion of the lower pipe, while the left half of the figure shows a locking part, whose end portion is located in a position, wherein it is engaged with the locking portion.
Figure 10:
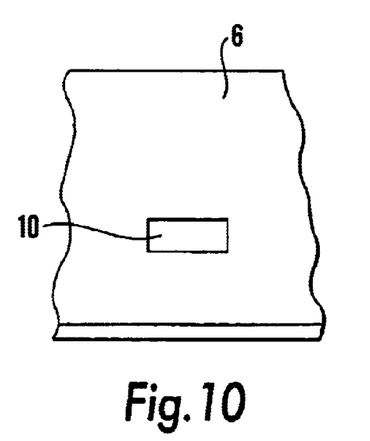
FIG. 10 is a view in the direction of the arrow A in FIG. 1.

In FIG. 1 there is illustrated a first pipe 2 with a first end portion 4 with a longitudinal axis 3. The end portion 4 has a guide portion 6 with an upwardly pointed casing 8 in the form of a truncated cone. As also illustrated in FIG. 10, through the casing and along its circumference there is provided at least one hole 10. In the illustrated embodiment the device comprises four holes 10 which are arranged at equal intervals along the periphery of the casing 8. The holes 10 are rectangular, preferably square. The casing 8 has radially inwardly projecting flanges 14 and is connected thereby with radially outwardly projecting flanges 12 of the end portion 4.

At the end of the end portion 4 is a shoulder or a locking portion 16 which forms a male part of a known type of locking finger connector, e.g. a connector of the type illustrated in the above-mentioned NO 940464. The upper portion of the casing 8 together with the upper portion of the end portion 4 and the locking portion 16 defines an upwardly open space 18.

To the first pipe 2 a second pipe 22 has to be attached with a second end portion 24 with a longitudinal axis 23, where this second end portion 24 has to be aligned coaxially with the first end portion 4 before connection of the pipes 2, 22. The second pipe may be a spool piece for interconnection of end portions of two pipes.

Between the two end portions 4, 24 there may advantageously be placed a packing 20 which is arranged to provide a sealing connection between the pipes 2, 22 after connection thereof.

The second end portion 24 carries a number of fingers or locking parts 26 which can be tilted about respective axes extending near the locking parts' upper end and tangentially relative to the second end portion 24. The locking parts 26 have a hook-shaped, lower portion 28 and are arranged to be tilted between a first, outwardly tilted position, wherein the hook-shaped portion 28 is not engaged with the locking portion 16, and a second, inwardly tilted position, wherein it is engaged with and grips it from below. When the locking parts 26 are located in the inwardly tilted position, their radially outer surface preferably extends upwards and simultaneously towards the longitudinal axis of the second pipe.

Round the locking parts there is mounted an axially movable, sleeve-shaped operating or control body 30, which can slide axially on the second end portion 24. At its upper end, the control body 30 has a flange-shaped influencing portion 32, and at its lower end it has a pushing portion 34, with which the control body 30 can abut against the locking parts' radially outer surface. When the pipes' end portions 4, 24 abut against each other, and the control body 30 is moved downwards, the pushing portion 34 can effect a tilting of the locking parts 26 inwards from the position, wherein they are not engaged with the locking portion 16, to a position wherein they are engaged with the locking portion 16.

The second end portion 24 has an area with a greater wall thickness than the pipe 22 and an outer diameter which is larger than the outer diameter of the pipe 22. The control body 30 is arranged to slide on the outer surface of this area. At the top of the area is an upper, radially outwardly projecting flange or gripping portion 38 and at the bottom a second flange, which forms an upwardly facing shoulder 40.

Upon axial movement of the control body 30, a radially inwardly extending portion thereof can come into abutment against either this gripping portion 38 or the shoulder 40, thereby restricting the axial movement of the control body 30.

In order to counteract a rotation of the control body 30 about the second end portion 24, in the influencing portion 32 there is attached at least one upwardly projecting pin 42, which extends axially with a small clearance through an associated boring of the gripping portion 38.

Figure 5:
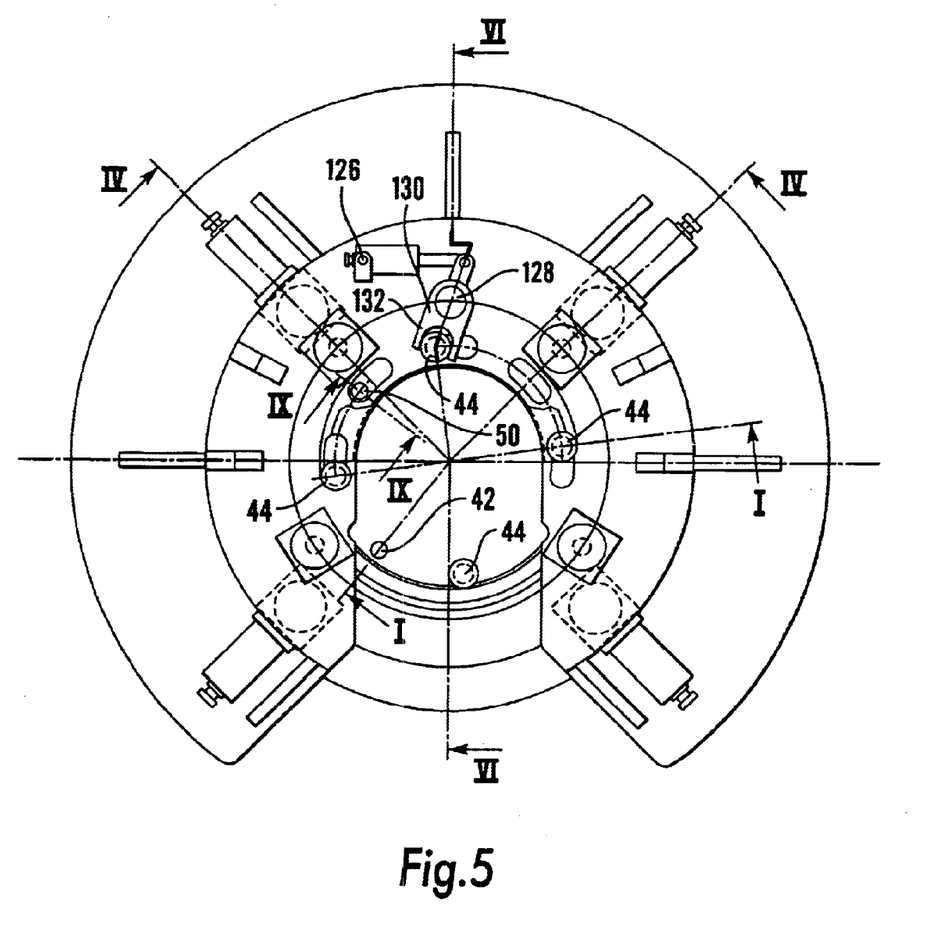
FIG. 5 illustrates a section along line V—V through the assembly illustrated in FIG. 4.
Figure 6:
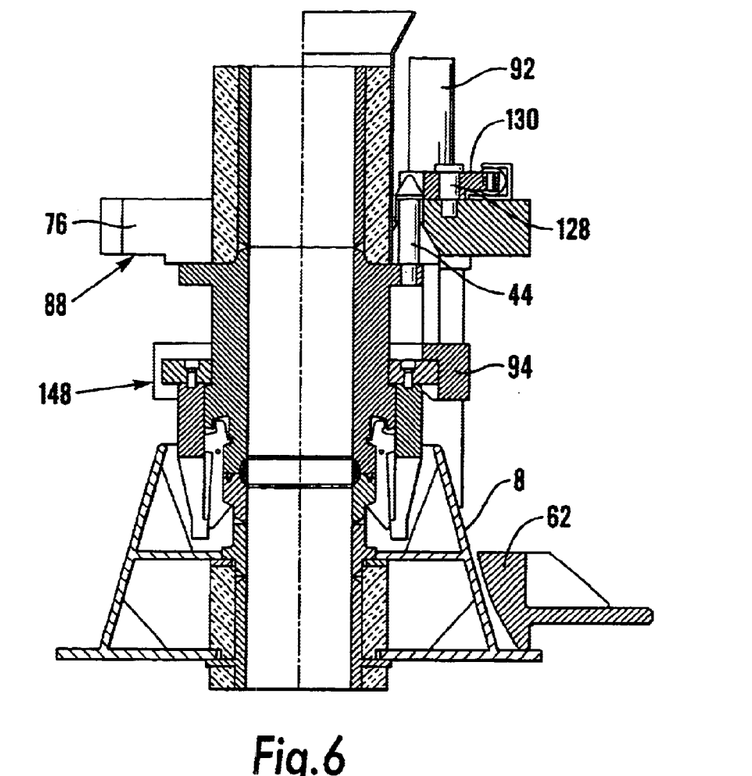
FIG. 6 illustrates a section along line VI—VI in FIG. 5.

As also illustrated in FIG. 5, axially upwardly projecting retaining pins 44 are attached at an angular distance of 90° from one another to the gripping portion 38 of the second pipe. The retaining pins 44 have a stem 46 and an upper portion or head 48 in the form of an upwardly pointed cone, whose largest diameter is larger than the diameter of the stem 46.

Figure 9:
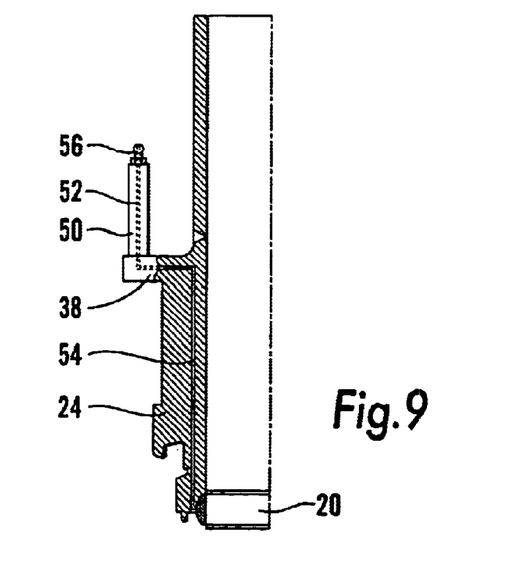
FIG. 9 illustrates a section along line IX—IX in FIG. 5.

As illustrated in FIGS. 9 and 5, in the gripping portion 38 between two of the retaining pins 44 there is attached a pressure or tightness testing tap or pin 50 which preferably has the same diameter as the pin 42. Through this pin 50 extends a first boring 52 which communicates with a second boring 54, which is provided in the end portion 24, and which extends to the packing 20. The pin 50 has a nipple 56 via which it can be connected to a device (not shown) for testing whether the connection between the pipes 2, 22 at the packing 20 is tight.

Figure 3:
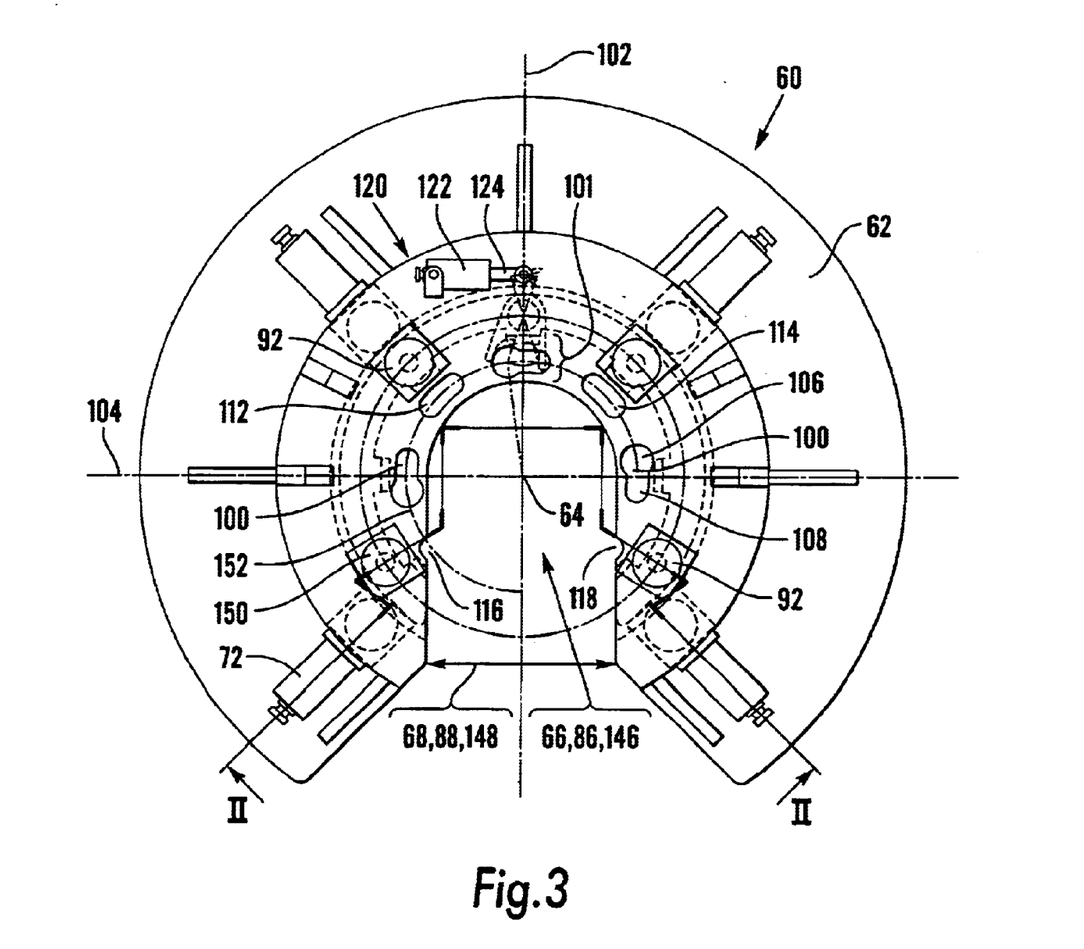
FIG. 3 is a top view of the tool illustrated in FIG. 2.

FIG. 3 is a plan view of a tool 60 for remotely controlled drawing together of end portions 4, 24 of the pipes 2, 22 when the end portions 4, 24 are coaxial with each other and located at a short distance apart with an intermediate packing 20 without both the pipes abutting against it. After the pipes have been pulled together by means of the tool 60, the tool 60 is arranged to operate the control body 30 in order to bring the locking parts 26 into engagement with the locking portions 16, thus causing the packing 20 to be tightly clamped between them.

Furthermore, the tool 60 is arranged to release the locking parts 26 from the locking portions 16 and subsequently to push the pipes' end portion 4, 24 apart, e.g. in order to perform a packing replacement. This can be carried out while the pipes are kept axially aligned with each other.

Figure 2:
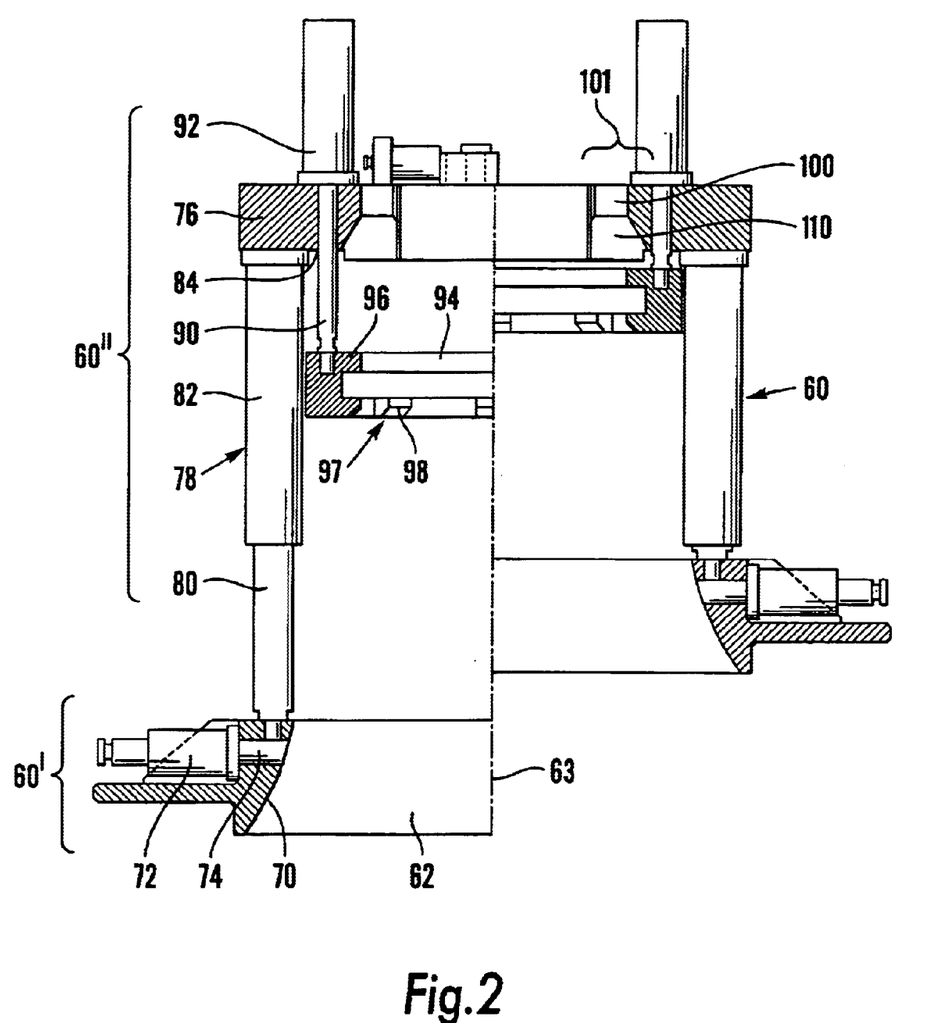
FIG. 2 illustrates a section along line II—II in FIG. 3 through a tool for connecting the pipes illustrated in FIG. 1.

As can also be seen in FIG. 2 which illustrates a section along line II—II in FIG. 3 through the tool 60, at the bottom of the tool 60 is a positioning part 62, which extends in a C-shape along a part of a circular arc with a centre 64. The positioning part 62 thus defines a central passage 66 with a longitudinal axis extending through the centre 64 and perpendicular to a plane through the circular arc. This longitudinal axis coincides with a longitudinal axis 63 of the tool 60. The ends of the positioning part 62, considered in its circumferential direction, define an opening 68. The width of the opening is greater than the diameter of the end portions 4, 24. When the end portions' longitudinal axes 3, 23 and the tool's longitudinal axis 63 are parallel to one another, the end portions 4, 24 can be passed in their transverse direction through the opening 68 into the passage 66. The positioning part 62 can then be moved axially relative to the end portions 4, 24 until it abuts against the guide portion 6, with the result that the end portions 4, 24 and the tool 60 are coaxial.

The opening is symmetrical about a symmetry plane 102 comprising the tool's longitudinal axis 63. A transverse plane 104 extends through the tool longitudinal axis 63 and perpendicular to the symmetry plane 102, see FIG. 3.

In the description of other components of the tool 60 which are similarly C-shaped, reference will be made to this positioning part 62.

A radially inner surface 70 of the positioning part is designed in a substantially complementary manner relative to the outer surface of the casing 8 of the guide portion 6. In a longitudinal section, however, it may be slightly curved, as illustrated in FIG. 2, in order to permit some degree of tilting of the tool 60 when it is resting on the casing 8.

On its outside, considered in the radial direction, the positioning part 62 carries a number of, e.g. four, first actuators or positioning actuators, e.g. hydraulic cylinders 72, whose piston rods 74 during operation of the hydraulic cylinders are each arranged to be inserted into a hole 10 or groove of the casing 8 when the positioning part 62 has been brought into abutment against the casing 8. The piston rods' diameter or cross sectional dimension, considered in the vertical direction, is hereby advantageously slightly smaller than the width of the holes considered in the same direction, thus permitting some degree of obliqueness or misalignment of the tool, e.g. of approximately 4° relative to the first pipe 2. The holes' length in the horizontal direction is greater than the piston rod's diameter. The positioning part 62 can thereby be rotated about the tool's longitudinal axis for an angular distance, while it cannot move or can only move to a very limited extent in the vertical direction.

The positioning part 62 and the first actuators 72 form a positioning section 60' of the tool 60, thereby enabling the tool 60 to be brought into a correct axial position relative to the first end portion 4.

Above the positioning part 62 is mounted a main part 76 which is connected to the positioning part 62 via a second actuator device comprising a number of main actuators, e.g. hydraulic cylinders 78 extending axially relative to the tool's longitudinal axis 63. The hydraulic cylinders' piston rods 80 may be attached to the positioning part 62, and their cylinder parts 82 may be attached to the main part 76. Like the positioning part 62, the main part 76 is C-shaped and has a central passage 86 and an opening 88 facing the same way as the opening or the lateral opening 68 of the positioning part 62. The main part 76 may, e.g., be plate-shaped, and the main actuators 78 may be located at regular intervals along a circular arc whose centre is located on the tool's longitudinal axis 63.

As illustrated in FIG. 3, axially through the main part 76 and on a first circle 150 with its centre on the tool's longitudinal axis 63, radially inside the two main actuators 78 which are located at a distance from the opening 86, and on each side of the main part's 76 passage 86 at the transverse plane 104, there are provided holes 84, through which there downwardly extend piston rods 90 of third actuators or locking actuators 92, e.g. hydraulic cylinders. The piston rods 90 are connected to a locking ring 94 which extends in a C-shape in the same way as the positioning part 62.

At its axially upper end the locking ring 94 has a radially inwardly projecting flange 96, and at its axially lower end a gear rim or ring 97 with a number of radially inwardly projecting teeth 98. The inner diameter of the flange 96 may correspond to the diameter of the top circle for the teeth 98.

Upon operation of the main actuators 78, the main part 76 may be moved axially relative to the positioning part 62, and upon operation of the locking actuators 92, the locking ring 94 may be moved axially relative to both the main part 76 and the positioning part 62.

Along a second circle 152 with its centre on the tool's longitudinal axis 63 and whose diameter is smaller than the first circle 150, in a radially inner peripheral portion 101 of the main part 76 there are provided through-going holes or retaining pin holes 100 for the retaining pins 44. The holes 100 are elongated, extending a short angular distance along the second circle 152. At the foremost-located end of the holes 100, considered in an anticlockwise direction in FIG. 3, the holes 100 have an extended, first end portion 106 and a diameter which is slightly larger than the largest diameter of the head 48 of the retaining pins 44, while the second or rear end portion of the holes has a radial width which is slightly larger than the width of the retaining pins' stem 46, but smaller than the diameter of the head 48. The holes 100 can thereby be said to be keyhole-shaped.

A retaining pin hole 100 is located at the symmetry plane 102 remotely from the opening 86 in the main part 76, while two retaining pin holes 100 are located at the transverse plane 104.

The retaining pin holes 100 have a lower hole portion 110 which is extended downwards, thus enabling the retaining pins 44 to be guided into the holes 100 when they are inserted therein from below.

With their centres in the second circle 152 and radially inside the holes 84 for the locking actuators 92 positioned near the portion of the passage 86 which is located remotely from the opening 88, two holes 112, 114 are also provided, into which the pressure testing tap or pin 50 or the pin 42 can be inserted. The holes 112, 114 are elongated with a length corresponding to the holes 100 for the retaining pins 44, but with a constant width corresponding to the diameter of the pressure testing pin 50 and the pin 42. In addition, at this circle and on each of the edges of the main part 76 which defines the opening 88, a recess or notch 116 and 118 respectively is provided approximately in the form of a surface of a semi-circular cylinder. Thus the front end of the hole 112, considered in an anti-clockwise direction in FIG. 3, is located diametrically facing the notch 118, while the rear end of the hole 114 is located diametrically facing the rear end of the notch 116. If the main part 76 is passed down from above towards the flange 38 of the second pipe end portion 24 and retaining pins 44 are inserted into their holes 100, the main part 76 and the flange 38 can thereby be placed in four positions relative to each other with an angular spacing of 90°, one such position being illustrated in FIG. 3. In each of the positions the main part 76 and the flange 38 can be rotated relative to each other about their longitudinal axis for an angular distance corresponding to the length of the holes 100, 112, 114 minus the diameter of the retaining pin's stem, and the retaining pins' head 48 can be passed from the extended portion 106 of the holes 100 to opposite end thereof, with the result that the head of the retaining pins prevents an axial movement of the main part 76 away from the flange 38.

As illustrated in FIGS. 3 and 5, on the portion of the top of the main part facing away from its opening 88, there is mounted a rotary actuator or fourth actuator 120, e.g. a hydraulic cylinder with a cylinder part 122 and a piston rod 124 extending parallel to the main part's plate plane. The cylinder part 122 may be hinged to the main part 76 via a hinged bolt 126. On the main part 76, between the fourth actuator 120 and the passage 86 of the main part 76 near the symmetry plane 102, there is attached an upwardly projecting pivot pin 128 on which is rotatably mounted a lever arm 130, one end portion of which is linked to the free end of the piston rod 124, and the second end portion 132 of which is in the form of a two-pronged fork. The distance between the prongs of the fork-shaped end portion 132 is adapted to the largest diameter of the head 44 of the retaining pins. The stroke of the rotary actuator 120 is such that it can move the fork-shaped end portion 132 between a first position, wherein it is located near the extended portion 106 of the adjacent hole 100 for the retaining pins 44, and a second position wherein it is located near the opposite end of this hole 100. If the main part 76 is passed from above down towards the flange 38 of the second pipe end portion 24 and retaining pins 44 are inserted in their holes 100, the fork-shaped end portion 132 of the lever arm 130 can thereby grip the head 48 of the retaining pin 44, and the main part 76 and the flange 38 are rotated forwards and backwards relative to each other for an angular distance depending on the length of the holes 100, 112, 114 as mentioned above, by means of the rotary actuator 120.

Figure 4:
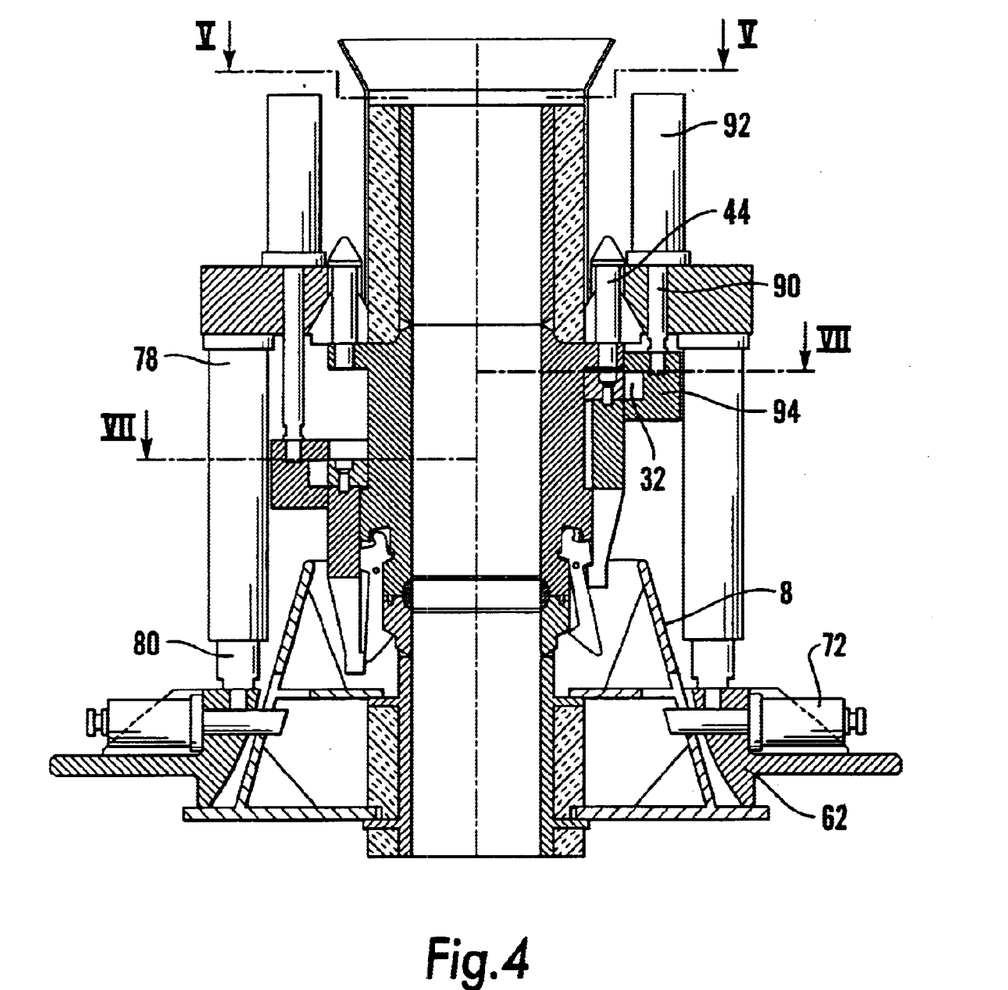
FIG. 4 illustrates a longitudinal section along line IV—IV and through the assembly illustrated in FIG. 5, and comprising two pipes on which a tool is mounted for connecting the pipes.
Figure 7:
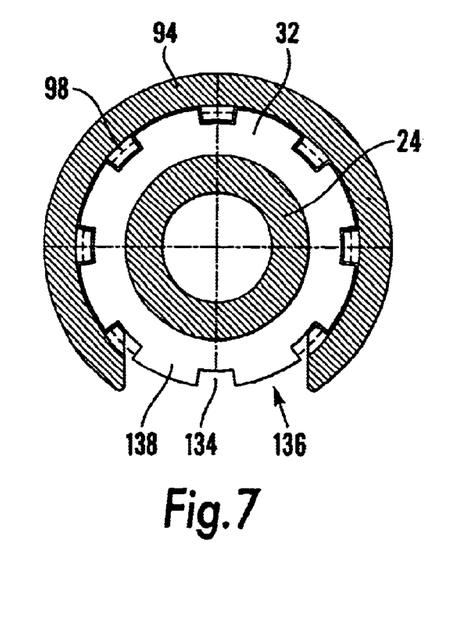
FIG. 7 illustrates a section along line VII—VII in FIG. 4 through a bayonet coupling where the connector parts have been moved axially in relation to one another.
Figure 8:
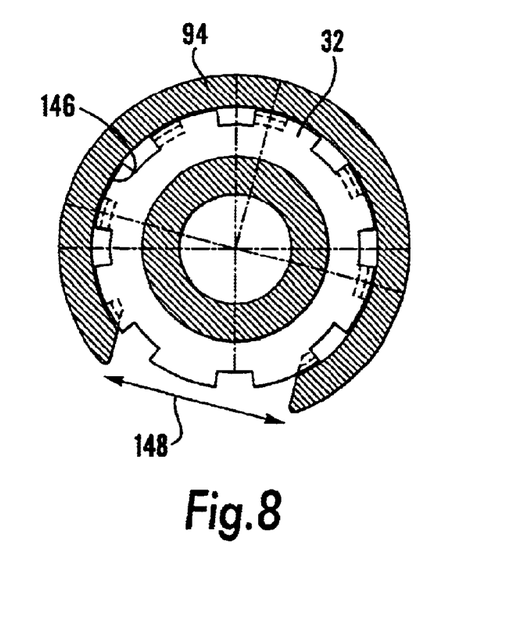
FIG. 8 illustrates a section similar to the section illustrated in FIG. 7, but where in addition the connector parts have been rotated about their longitudinal axis.

As illustrated in FIGS. 4, 7 and 8, in the circumferential portion of the influencing portion 32 a number of radially inwardly extending notches 134 are provided which have the same relative angular spacing as the teeth 98 of the locking ring 94. The notches 134 have the same shape as the teeth 98, but are slightly larger than them. The outer diameter of the influencing portion 32 is larger than the inner diameter of the flange 96 of the locking ring 94, but smaller than the diameter of the root of the teeth 98. The axial distance between the teeth 98 and the flange 96 of the locking ring 94 is slightly larger than the axial thickness of the influencing portion 32.

If the locking ring 94 is moved coaxially relative to the influencing portion 32 and downwards towards it, the teeth 98 of the locking ring 94 can be inserted into respective notches 134 of the influencing portion 32. Such an insertion is assured if the retaining pins 44 have first been inserted in the associated holes 100 of the main part 76, the relative position of the locking ring 94 and the main part 76 being determined by the locking actuator 92. The flange 96, however, will then come into abutment against the top of the influencing portion 32, thus preventing a further relative axial movement. In this position, however, the teeth 98 have been passed completely through the notches 134, thus enabling the locking ring 94 and the influencing portion 32 to be rotated relative to each other by means of the rotary actuator 120 to a position, wherein they overlap each other axially and an axial relative movement is prevented.

For operation of the actuators 72, 78, 92, 120, they can be coupled, e.g. to a pressure fluid source of a remotely operated underwater vehicle (not shown). Furthermore, such a vehicle can be employed to bring the pipes 2, 22 into a correct relative position before connection thereof and in general to monitor a connection or a disconnection of the end portions 4, 24 from each other.

The function of the device according to the invention will be explained below, on the assumption, for example, that two devices of this type have to be used for mounting a spool piece between two pipe end portions of pipes or pipe connections of respective installations for extraction of hydrocarbons from an oil well on a seabed. Such spool pieces typically have a length of approximately 20–50 m.

As a starting point it should therefore be assumed that the installations are located on the seabed and that each of them is provided with a pipe or a pipe connection which corresponds to the first pipe 2 and has an end portion which is designed in the same way as the first end portion 4.

To begin with, the distance between the installations' pipe end portions is measured accurately, and based on this measurement, a spool piece is manufactured which is provided with end portions corresponding to the above-mentioned second end portions 24, which can be mounted between the installations' pipe end portions. The spool piece is preferably provided in the form of a U, thus making it to some extent elastically yielding, thereby keeping mechanical stresses in the spool piece and the pipes to a minimum if, after connection with the installations, circumstances should arise, e.g. temperature variations, which attempt to effect a change in the spool piece's dimensions or the relative distance between the end portions of the installations' pipes.

Before the spool piece is lowered to the installations on the seabed, a tool corresponding to the tool 60 is attached to each of the spool piece's end portions. Each of the C-shaped tools' lateral openings (68, 88, 148) is hereby mounted, for example, in an angular position relative to the respective end portions of the spool piece, in such a way that a subsequent removal of the tool will be easy. As mentioned above in connection with the described embodiment of the device, the tool may be mounted in four positions relative to the spool piece's end portion.

In the further explanation, the mounting of only one of the end portions of the spool piece to one of the installations will be described, it being understood that the second end portion of the spool piece should be mounted to the second installation in a similar manner.

For mounting the tool 60 on to the spool piece, the former is therefore placed beside the spool piece with its lateral opening 68, 88, 148 facing the spool piece 22 and with its longitudinal axis 63 extending parallel to the spool piece's longitudinal axis 23. Furthermore, the tool's first and third actuators, i.e. the positioning actuator 72 and the locking actuator 92, are activated in such a manner that their piston rods are moved to their inner position, i.e. retracted in the cylinders. On the other hand, the second actuator or main actuator 78 and the fourth actuator or rotary actuator 120 are activated in such a manner that their piston rods are moved to their outer position.

The tool 60 is then moved in such a manner that the spool piece 22 is inserted in the lateral openings 68, 88, 148 and into the passages 66, 86, 146 until the tool 60 and the end portion 24 are coaxial.

The tool may then be rotated about its longitudinal axis until the retaining pins 44 extend coaxially with the extended portion 106 of the holes 100, whereupon the tool 60 is moved axially relative to the spool piece in such a manner that the retaining pins 44 are inserted in the holes 100 until the main part 76 comes into abutment against the gripping portion 38.

The influencing portion 32 is then moved upwards towards the locking ring 94 until the locking ring's teeth 98 have been passed through the influencing portion's notches 134 and the first gear rim 136 which comprises the teeth 138 is located between the flange 96 and the second gear rim 97 which comprises the teeth 98. The locking parts or fingers 26 are then located in an outwardly pivoted position as illustrated in the right half of FIG. 1.

The rotary actuator 120 is now operated, thus causing the tool 60 to be rotated anticlockwise in FIG. 5 relative to the spool piece 22 and about its longitudinal axis 23, until the retaining pins 44 come into abutment against the end of the narrow portion 108 of the holes 100. The locking ring 94 is hereby also rotated relative to the influencing portion 32, with the result that the teeth 98 at least incompletely overlap the notches 134. The heads 48 of the retaining pins 44 then prevent the main part 76 from being pulled axially away from the gripping portion 38, and the relative movement of the teeth 98 and the notches 134 prevents the locking ring 94 from being moved axially relative to the influencing portion 32. The tool is now attached to the end portion 24 of the spool piece.

The same operation is performed with the second tool for connection thereof to the second end portion of the spool piece.

The spool piece is then connected to a winch line and lowered to the installations on the seabed while being monitored by a remotely operated vehicle (ROV), thus ensuring that the end portions of the spool piece are mounted facing the end portions of the pipes of the respective installations. The guide portion 6 of the end portion 24 of the installations and the surface 70 of the positioning part 62 of the tools 60 hereby contribute towards a relative alignment of the end portions 24 of the spool piece and the respective end portions 4 of the installations.

In the further description, reference will again be made to a connection of only one end portion of the spool piece to one installation.

When the tool's and the installation's end portions have been aligned and brought close together, the positioning actuators 72 can be operated, thus causing the piston rods 74 to be inserted in the holes 10, thereby locking the tool 60 to the end portion 4 of the installation. If these holes 10 have a vertical dimension which is slightly larger than the vertical dimension of the portion of the piston rods 74 which is inserted in the holes 10, the spool piece can be capable of being tilted to a small angle, e.g. about 4°, relative to the installation's end portion 4. This is advantageous since the situation may arise where the installations are located on different levels. The size of this angle, however, is limited, since it cannot be so large that not all of the locking fingers can be simultaneously brought into engagement with the locking portions 16 of the installation's end portion 4.

The piston rods 74 are now located in the lower portion of the holes 10.

The remotely operated vehicle is now used for inspection and possibly cleaning of connecting surfaces of the locking finger connector and possibly for installation of a packing 20.

The winch line can then be released from the spool piece and removed, whereupon the main actuators 78 can be operated for retraction of the piston rods 80 into the cylinders 82, thus bringing the end portions 4, 24 close together.

By operating the locking actuators 92, the locking ring 94 can now be moved axially downwards, thereby bringing along the influencing portion 32 and the control body 30, thus enabling its pushing portion 34 to force the locking parts' hook portions 28 radially inwards, with the result that they are brought into engagement with the locking portion 16 of the installation. The spool piece 22 will thereby be forced against the installations' pipe 2, hereby strongly compressing the packing 20, and thus providing a tight connection.

During this drawing together of the spool piece's and the installation's end portions 4 and 24 respectively, the pressure on the actuators 78 will have been relieved, with the result that the force, which is exerted in the holes 10 against the piston rods 74, has been reduced.

The pressure on the locking actuators 92 may also be relieved.

The rotary actuator 120 may then be operated in order to rotate the tool 60 in the opposite direction relative to the end portions 4, 24, i.e. in such a manner that the heads 48 of the retaining pins are moved to the extended portion 106 of the holes 100 and the locking ring's teeth 98 overlap the influencing portion's notches 134.

The main actuators 78 can then be operated in order to move the operation section 60" away from the positioning section 60', with the result that the retaining pins 44 are no longer located in the holes 100 and the locking ring 94 is pulled away from the influencing portion 32, whereupon the positioning actuators 72 are operated for releasing the positioning section 60' from the casing 8.

The tool 60 can then be pulled in its transverse direction away from the spool piece 22 and the pipes 2, these being moved out through the tools' lateral openings 68, 88, 148.

The pipes 2, 22 are now secured relative to each other by means of the locking parts or fingers 62 of the spool piece 22 which are engaged with the locking portions 16 of the pipes 2 of the installations.

After the pipes have been interconnected in this manner, the nipple 56 can be connected to a pressure testing device (not shown) by means of the remotely operated vehicle, in order to test the sealing ability of the packing 20 in a known per se manner.

This may be carried out before or after the tool has been removed from the end portions 4, 24.

Replacement of the packing 20 can be carried out by mounting a tool 60 on the interconnected end portions 4, 24 as described above. After this assembly, the locking actuators 92 can firstly be operated for releasing the locking parts 26, thus causing them to be tilted radially outwards and brought out of engagement with the locking portion 16. The main actuators 78 can then be operated, thus causing the operation section 60" to be forced away from the positioning section 60', whereby the end portions 4, 24 are moved apart to such an extent that the locking parts' lower portion 28 is located over the packing 20. The packing 20 can then be gripped, e.g. by means of devices of the remotely operated vehicle, and replaced by a new packing. The tool's actuators can then once again be operated for joining the pipes 2, 22 as indicated above, whereupon a pressure test can be performed for the new packing 20.

Even though in the above there has been described an embodiment of a device for connecting end portions of two pipes, it will be appreciated that the tool may be designed differently.

In order to prevent a relative rotation of the control body 30 and the second end portion 24, these components may, e.g., comprise respective interacting, longitudinal teeth or splines.

The retaining pins 44 and the main part's inner peripheral portion 101 and the teeth 98 and the notches 134 respectively form components of a quick release coupling. This quick release coupling corresponds to a bayonet coupling with L-shaped groove portions or guide surfaces, where, e.g., the long leg extends axially, ensuring a relative axial passage of the quick release coupling's components, and the short leg ensures a relative transverse passage of the components, whereupon the components cannot be moved axially relative to one another.

Thus it will be understood that the retaining pins 44 of the second end portion 24 and the holes 100 in the main part 76 and the locking ring's teeth 98 and the influencing portion's notches 134 respectively can be replaced by other types of quick release coupling. For example, the device may comprise quick release couplings whose components can be joined during the initial movement of the tool across the end portions' longitudinal axes. For example, the tool may comprise pins which extend across the tool's longitudinal axis and which can be inserted in respective corresponding holes of components of the pipe end portions. Another possibility is that the tool comprises fork-like gripping claws which are arranged to grip flange portions of the second pipe portion and the control device respectively during a transverse movement of the tool relative to the end portions.

It will also be understood that the pressure testing pin 50 and the packing 20 need not be a part of the device according to the invention provided another device is provided which ensures a satisfactory seal between the pipe end portions.

The actuators have been depicted as hydraulic cylinders in the drawing. However, it will be appreciated that any type of actuator may be employed which is suitable for the purpose involved.

What is claimed is:

1. A device for connecting a first end portion of a first pipe and a second end portion of a second pipe, where the end portions comprise respective components of a locking finger type connector, the first end portion comprising a locking portion, and the second end portion comprising a control body and locking parts, which, upon movement of the control body via an influencing portion thereof, is arranged to be moved between a first position, wherein the locking parts are not engaged with the locking portion and the pipe portions are not interconnected, and a second position, wherein the locking parts are engaged with the locking portion and the pipe portions are interconnected, the device comprising:

a guide portion of the first pipe, a gripping portion of the second pipe,
a tool with a positioning section and an operation section, in which
the positioning section has a positioning part and a first actuator device, whereby the positioning part can be releasably attached to the guide portion for securing the tool in a fixed, axial position relative to the first end portion, and
the operation section has a main part with at least one first and one second quick release coupling part, the gripping portion has at least one third quick release coupling part, and the influencing portion has at least one fourth quick release coupling part, the main part being arranged to be connected by remote control to the gripping portion by connecting the first quick release coupling part and the third quick release coupling part, and for connection with the influencing portion by connecting the second quick release coupling part and the fourth quick release coupling part, and
the operation section further comprises second, third and fourth actuator devices, whereby the main part can be moved axially by remote control relative to the positioning part and the influencing portion, as well as for operation of the quick release coupling parts.

2. The device according to claim 1, wherein the tool has a through-going passage which is defined by tool components, which extend along circular arc portions with their centers located on a common axis; the passage having a lateral opening, via which the tool can be passed laterally on the end portions of the pipes until the tool and the end portions are coaxial.

3. The device according to claim 1, wherein the outer shape of the guide portion corresponds to the surface of a cone which is coaxial with the first pipe, and which is pointed towards the end of the first end portion, and the positioning part has a portion which is complementary to the outer shape of the guide portion.

4. The device according to claim 1, wherein the first actuator device comprises at least one actuator with a locking element, and the guide portion has a portion whose shape matches the locking element for relative releasable attachment of the positioning section and the guide portion and axial securing of the tool on the first pipe.

5. The device according to claim 1, wherein a pair which is composed of the first quick release coupling part and the third quick release coupling part and a pair which is composed of the second quick release coupling part and the fourth quick release coupling part, are pairs of interacting bayonet coupling parts.

6. The device according to claim 5, wherein one part of the pairs comprises a male part and the other part of the pairs is a female part with an L-shaped groove having a first leg which extends axially, and a second leg which extends transversely relative to the first leg, the second and third actuators are arranged for movement of the operation section axially relative to the positioning section and the influencing portion respectively and thereby the male parts along the axially extending first leg of the female parts, and the fourth actuator device is arranged for movement of the male parts along the second leg of the female parts.

7. The device according to claim 6, wherein the female parts are comprised of the tool, and the second leg of the female parts extends in a tangential direction relative to a longitudinal axis of the tool.

8. The device according to claim 5, wherein the fourth quick release coupling part is a flange of the influencing portion and comprises a first gear rim of radially outwardly projecting first teeth which define axially extending notches, the second coupling part comprises a second gear rim which has radially inwardly projecting second teeth and whose pitch corresponds to the pitch for the first gear rim, and a radially inwardly projecting circular flange with an inner diameter, which is smaller than a top circle for the first gear rim, each of the second teeth being arranged to be passed axially between adjacent, first teeth, and the second gear rim is arranged at a distance from the flange corresponding to the axial dimension of the first gear rim, and the gear rims are arranged to be rotated relative to each other for a distance corresponding to approximately half a tooth pitch.

9. The device according to wherein claim 8, wherein the fourth actuator device is arranged for rotation of the tool relative to the second pipe.

10. The device according to claim 1, wherein the influencing portion and the second end portion have interacting areas which prevent a relative rotation about a longitudinal axis of the end portion.

11. The device according to claim 1, wherein the actuator devices are arranged for remotely controlled activation.

12. A method for connecting a first end portion of a first pipe and a second end portion of a second pipe, where the end portions comprise respective components of a locking finger type connector, the first end portion comprising a locking portion, and the second end portion comprising a control body and locking parts which upon movement of the control body via an influencing portion thereof, is arranged to be moved between a first position, wherein the locking parts are not engaged with the locking portion and the pipe portions are not interconnected, and a second position, wherein the locking parts are engaged with the locking portion and the pipe portions are interconnected, the method comprising:
providing a device comprising:
a guide portion of the first pipe,
a gripping portion of the second pipe,
a tool with a positioning section and an operation section, in which
the positioning section has a positioning part and a first actuator device, whereby the positioning part can be releasably attached to the guide portion for securing the tool in a fixed, axial position relative to the first end portion, and
the operation section has a main part with at least one first and one second quick release coupling part, the gripping portion has at least one third quick release coupling part, and the influencing portion has at least one fourth quick release coupling part, the main part being arranged to be connected by remote control to the gripping portion by connecting the first quick release coupling part and the third quick release coupling part, and for connection with the influencing portion by connecting the second quick release coupling part and the fourth quick release coupling part, and
the operation section further comprises second, third and fourth actuator devices, whereby the main part can be moved axially by remote control relative to the positioning part and the influencing portion, as well as for operation of the quick release coupling parts;
connecting the end portion of the second pipe with the tool;
transporting the second pipe and the connecting tool together to near the end portion of the first pipe;
connecting the end portion of the first pipe with the connecting tool;

activating the control body in order to bring the locking parts into engagement with the locking portion; and releasing the tool from the pipes and removing the tool.

* * * * *